Sept. 28, 1965     F. G. MORITZ ETAL     3,208,655
TAPE CONTROL CIRCUIT UTILIZING AN INDUCTIVE
ENERGY STORING MEANS
Filed Dec. 3, 1962     2 Sheets-Sheet 1
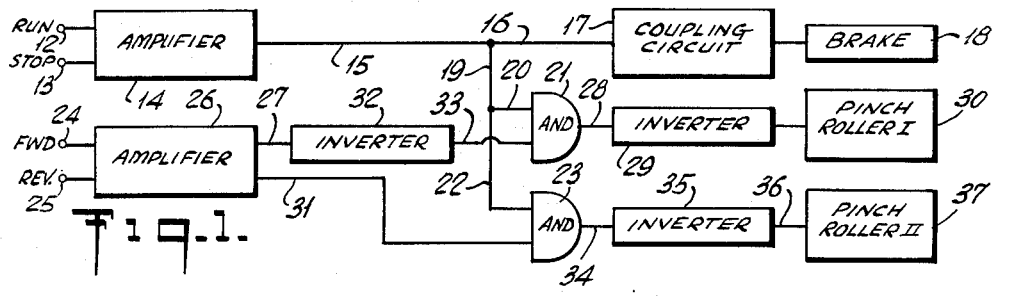
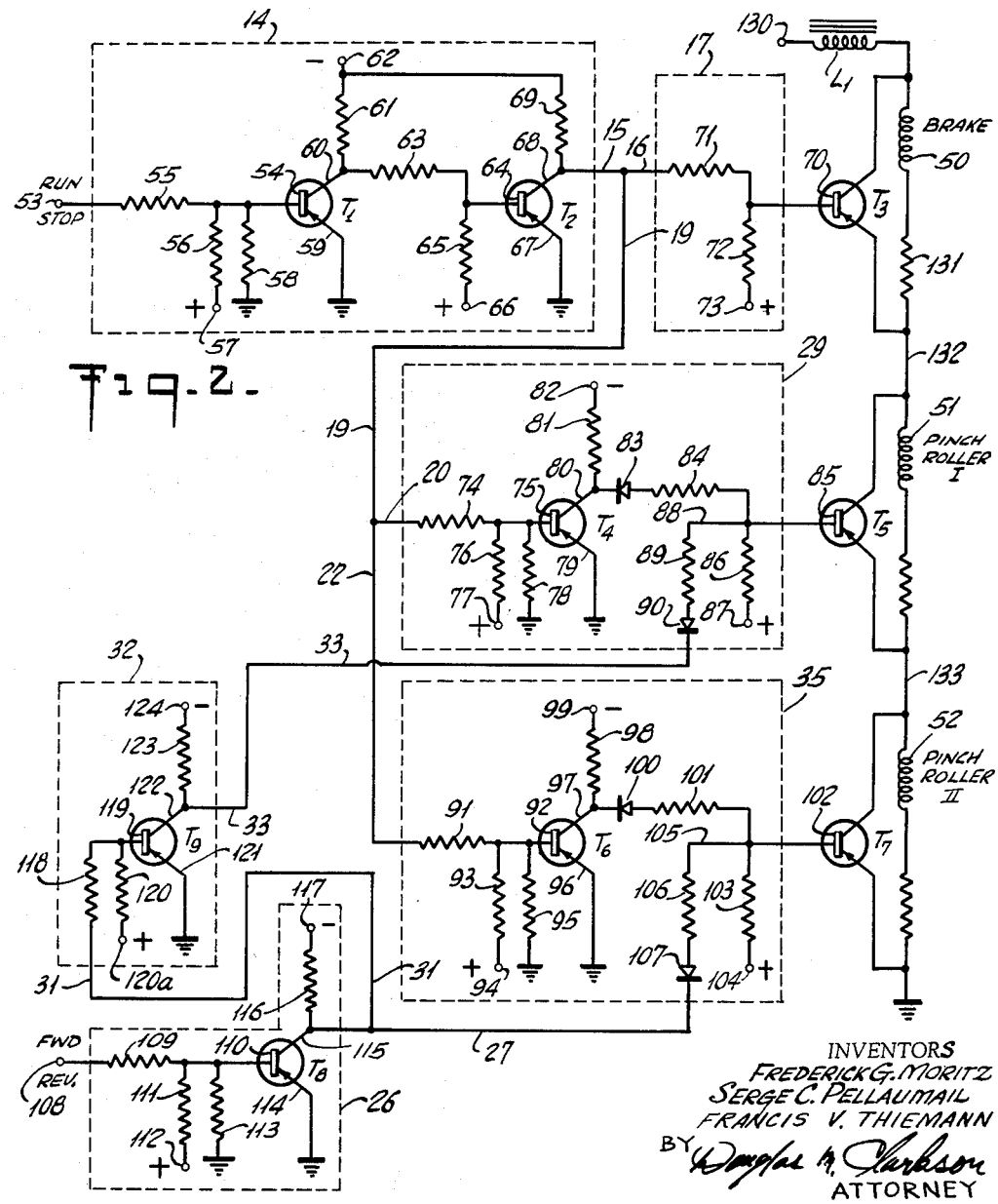
INVENTORS
FREDERICK G. MORITZ
SERGE C. PELLAUMAIL
FRANCIS V. THIEMANN
BY Douglas H. Clarkson
ATTORNEY

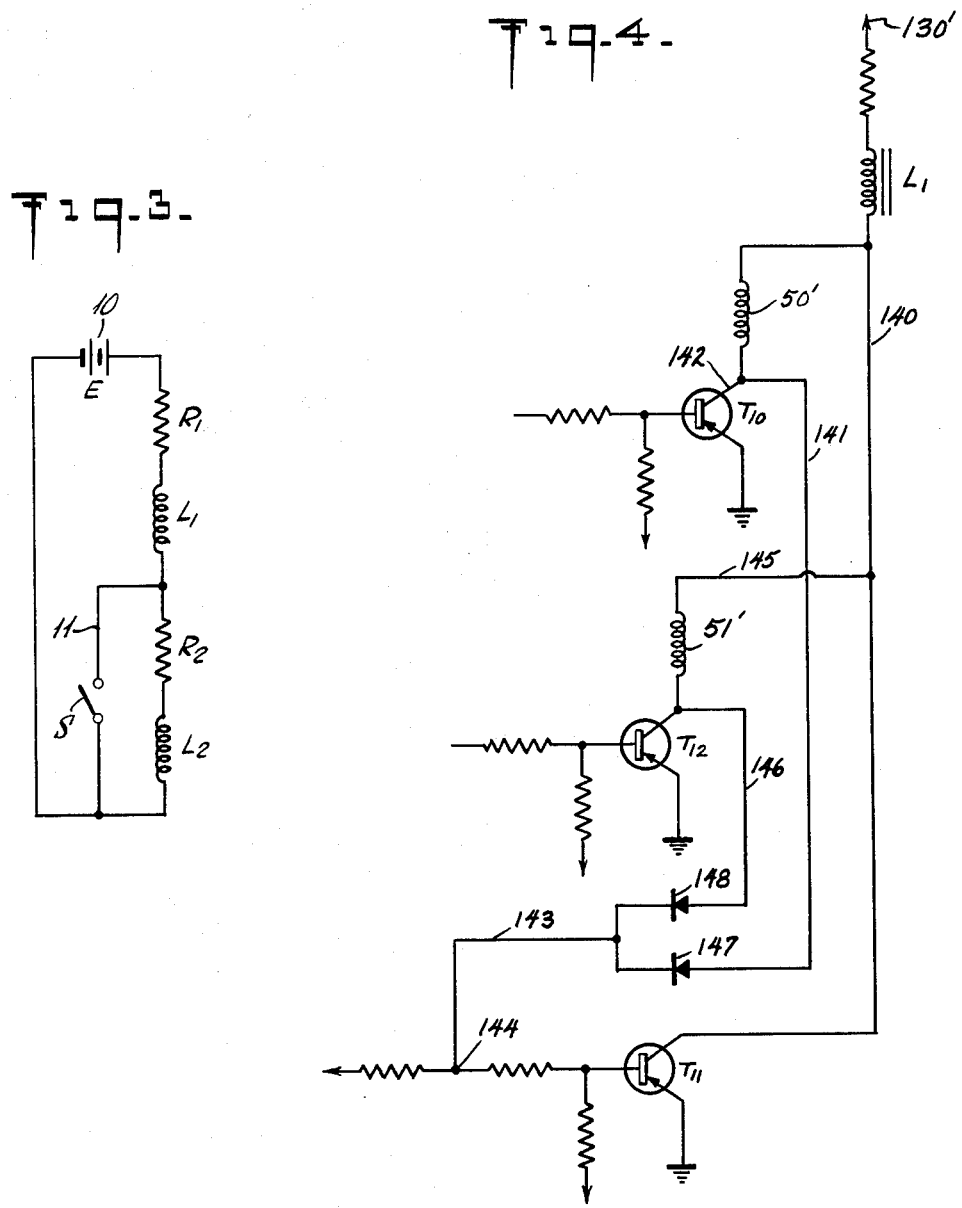

United States Patent Office 3,208,655
Patented Sept. 28, 1965

3,208,655
TAPE CONTROL CIRCUIT UTILIZING AN INDUCTIVE ENERGY STORING MEANS
Frederick G. Moritz, Hauppauge, Serge C. Pellaumail, Hicksville, and Francis V. Thiemann, Levittown, N.Y., assignors to Potter Instrument Company, Inc., Plainview, N.Y., a corporation of New York
Filed Dec. 3, 1962, Ser. No. 241,675
14 Claims. (Cl. 226—39)

The present invention, which is a continuation-in-part of Serial No. 182,554, filed March 26, 1962, now abandoned generally, relates to tape handler apparatus and, more particularly, to such apparatus having a new and improved electrical control circuit for actuation of a brake and one or more pinch rollers in a predetermined sequence.

Heretofore, brake actuator coils have been energized by means of a suitable electrical potential and an on-off switch device connected in series with the coil. The switch device would be closed to cause a flow of electric current to energize the coil, and conversely, the switch device would be opened to interrupt the current flow and de-energize the brake coil.

However, with such circuits heretofore used, a large resistance had to be inserted in series with the coil, switch and electrical potential to obtain a small time constant in the response of the brake coil. Otherwise, the operation of the brake was too slow to be practical.

With the large resistance that was needed, a large electrical potential was needed to obtain the necessary current flow for operation of the brake coil. The resulting high current flow developed excessive heat dissipated in the resistance, meaning a waste of power.

The present invention has as its principle object the provision of a circuit adapted for tape handler apparatus to achieve rapid action of the brake coil without accompanying energy waste.

It is also an object of the invention to provide a new and improved electrical circuit for controlling the operation of a brake actuator coil and one or more pinch roller actuator coils in a predetermined sequence.

A further object of the invention is to provide a high speed switching circuit without the usually accompanying energy dissipation.

Briefly, the invention relates to tape handler apparatus adapted to start and stop tape motion at high speeds for transferring information-representing code between a transducer means and an elongated tape, the apparatus including a brake actuator coil adapted to operate a brake device for reacting with the tape in bringing tape motion to a stop. An energy storage device, such as a choke inductor coil, is connected in series with the brake actuating coil, and an electrical shorting circuit including switch means is connected across the brake actuating coil, so that the brake actuating coil becomes energized by sharing electrical energy with the inductor coil when the switch means is operated to remove the short circuit.

These and other objects and advantages of the invention will become more apparent from the following detailed description of a preferred embodiment thereof described with respect to the accompanying drawings, in which:

FIG. 1 is a block diagram illustrating diagrammatically the component parts of the invention;

FIG. 2 is a circuit diagram in accordance with the principles of the invention;

FIG. 3 is a circuit diagram illustrating the principles of the invention; and

FIG. 4 is a circuit diagram showing a modification of the invention.

Referring first to FIG. 3 of the drawings to illustrate the principles of the invention, assume that a source of electrical potential 10 is connected in series with a choke inductor coil L1 having a resistance R1. Included in the series connection is a coil L2 having a resistance R2, the coil L2 representing the actuating coil of some device such as a brake or a pinch roller in a tape handler apparatus.

The coil L2 and the resistance R2 are shunted by a connection 11 which includes a switch S for removing the shunt when desired.

With the switch S closed, assume that an electric current flow has been established around the circuit including the potential source 10, resistance R1, coil L1, and the short circuit 11. Such current flow will be represented by the equation $I = E/R1$.

Now, assume that it is desired to achieve a fast rise of current in the coil L2 which normally has no current because of the short circuit 11. When the switch S is opened, the current flow in the series circuit will drop to a value represented by the equation $$I = \frac{E}{R1 + L1/L1 + L2}$$

This new current must also now flow in coil L2 and through resistance R2. Therefore, the current in coil L2 and resistance R2 will rise from zero to a value represented by the equation $$I = \frac{E}{R1 + LI/L1 + L2}$$

with a very fast rise time (theoretically, a rise time of zero). When the transient condition has died away, the steady state current flow will be indicated by the expression, $E/R1 + R2$.

The above-described effect is used to supply current to a brake and/or pinch roller actuating coil in a manner which is more economical and more efficient than anything heretofore known. The inductor coil L1 is identified as an external choke, and L2 is either a brake actuator coil or a pinch roller actuator coil. When the switch S is opened, an extremely fast rise in current is obtained in the coil L2 because the coil L2 instantly begins sharing the energy previously stored in the choke.

Of course, the particular parameters of the circuit may be selected so that the current developed in the coil L2 is the appropriate value required for proper operation of the associated device.

Referring now to FIG. 1 of the drawings, while the principles of the invention are adaptable equally for operation of a single pinch roller device for unidirectional tape movement, two pinch roller devices are illustrated in the drawings for the purpose of completeness of description.

Two separate input terminals, identified by the numerals 12 and 13, are provided to connect input signals to an amplifier circuit 14, although a single input connection may be used to receive actuating signals having different characteristics to represent the desired "run" and "stop" conditions. As will be described in the illustrative form of the invention hereinafter, a zero potential at the input is indicative of the "stop" condition, and a negative potential indicates the "run" condition.

The amplifier circuit 14 amplifies the input signal and connects it over leads 15 and 16 to a coupling circuit 17 for actuating a brake device 18. The output of the amplifier circuit 14 is connected also by means of the lead 15, and leads 19 and 20 to an AND gate 21, and by a lead 22, to an AND gate 23.

Depending upon whether a "forward" representing signal is applied at an input terminal 24 or whether a "reverse" representing signal is applied to an input terminal 25, an amplifier circuit 26 amplifies the applied signal and connects it by a lead 27 to an inverter circuit 32, and then by a lead 33 to condition the AND gate 21.

If the signal amplified by the amplifier circuit 26 is a "forward" representing signal, the AND gate 21 will be conditioned so that a signal connected thereto over the lead 20 will be connected by a lead 28 to an inverter circuit 29 for energizing the actuator coil of a pinch roller device 30. The inverter circuit 29 is included to ensure that the pinch roller device 30 will not be operated by the same signal which operates the brake device 18.

For example, assume that a positive signal is required to operate both the brake device 18 and the pinch roller device 30. A positive signal passing over the lead 15 is connected through the coupling circuit 17 to the brake device 18 and will operate the brake. However, such positive signal is inverted by the inverter circuit 29, and this prevents the pinch roller device 30 from operating.

The same "forward" representing signal connected over the lead 27 is connected over a lead 31 directly to the AND gate 23, but the AND gate 23 is not conditioned because this signal over the lead 31 now is not inverted. Therefore, the signal connected to the AND gate 23 over the lead 22 is prevented from passing over a lead 34 to an inverter circuit 35, and over a lead 36 to a "reverse" pinch roller device 37.

However, if it is desired to actuate the "reverse" pinch roller device 37 instead of the "forward" pinch roller device 30, an appropriate signal is applied to the terminal 25 for amplification by the amplifier circuit 26, such already-appropriate signal being inverted by the circuit 32 prevents the AND gate 21 from being conditioned, but this same signal is connected directly over the lead 33 to effectively condition the AND gate 23. Therefore, if a "run" signal (may be represented by a negative level) is applied to the terminal 12, the brake 18 will be de-energized, since it needs a positive signal, but the negative signal is inverted by the inverter circuit 35 resulting in actuation of the "reverse" pinch roller device 37.

To describe the circuit in still further detail for illustrative purposes, reference now is made to FIG. 2 of the drawings, which shows a brake actuator coil 50, a first or "forward" direction pinch roller actuator coil 51 and a second or "reverse" pinch roller actuator coil 52. For convenience, the circuit enclosed within the broken lines 14 is an illustration of the amplifier circuit 14, shown in FIG. 1, and the circuit enclosed within the broken lines 17 is comparable with the coupling circuit 17, also shown in FIG. 1. Similarly, the inverter circuits 29, 35 and 32 are shown in FIG. 2 along with the amplifier circuit 26.

A signal input at the single "run-stop" terminal 53 is connected to the base 54 of a transistor T1 by a resistor 55 which provides a desired input impedance. A resistor 56 is connected between the base terminal 54 and a suitable source of positive voltage at a terminal 57, and a resistor 58 is connected in parallel therewith to ground, so that the two resistors 56 and 58 provide a voltage divider network to bias the transistor T1 in a normally "off" condition.

An emitter terminal 59 of the transistor T1 is connected directly to ground, but the collector terminal 60 is connected through a resistor 61 to a source of negative voltage at a terminal 62, this resistor 61 providing the usual collector load for the transistor T1.

The output of the transistor T1 is connected from the collector terminal 60 through a resistor 63 to a base terminal 64 of a second transistor T2, the base terminal 64 being connected also through a resistor 65 to a source of positive voltage at a terminal 66. It will be noted that the two resistors 63 and 65, while performing a coupling network function, also serve to bias the transistor T2 normally "off."

An emitter terminal 67 is connected directly to ground, and a collector terminal 68 is connected through a resistor 69 to the same source of negative voltage at the terminal 62. Also, the output of the transistor T2 and, therefore, the output of the amplifier circuit 14 is connected from the collector terminal 68 over a lead 15 and a lead 16 to a base terminal 70 of a switching transistor T3, after first passing through a coupling network 17 formed by a series-connected resistor 71 and a resistor 72, the resistor 72 being connected from the base terminal 70 to a source of positive voltage at a terminal 73.

The output connected from the lead 15 is connected also over the lead 19 and the lead 20 to the inverter circuit 29, as well as over the lead 22 to the other inverter circuit 35. At the input to the inverter circuit 29, the signal passes through a resistor 74 to a base terminal 75 of a transistor T4. Also connected from the base terminal 75, a resistor 76 is connected to a source of positive voltage at a terminal 77, and a resistor 78 is connected from the base terminal 75 directly to ground.

An emitter terminal 79 is connected directly to ground, but the collector terminal 80 of the transistor T4 is connected through a load resistor 81 to a source of negative voltage at a terminal 82.

The output of the transistor T4 is obtained at the collector terminal 80 and is connected through a diode 83 and a resistor 84 to a base terminal 85 of a switching transistor T5. A resistor 86 is connected from the base terminal 85 to a source of positive voltage at a terminal 87.

While the resistors 84 and 86 provide a coupling circuit between the inverter circuit which includes the transistor T4, the switching transistor T5 will not be operated if the base terminal 85 is prevented from reaching the necessary potential, and this control is obtained by a lead 88, through a resistor 89 and a diode 90 connected by the lead 33 to the inverter circuit 32 as shown in FIG. 1. In other words, the lead 88 provides the conditioning connection illustrated to the AND gate 21 in FIG. 1, except that the circuit arrangement included within the broken line 29 in FIG. 2 shows the AND function performed after the inverter function when compared with the positions of the circuits 21 and 29 shown in FIG. 1. However, this is only a matter of a specific circuit arrangement.

To control the "reverse" pinch roller device 37, the lead 19 is connected over the lead 22 through a resistor 91 to a base terminal 92 of a transistor T6. A resistor 93 is connected from the base terminal 92 to a source of positive voltage at a terminal 94, and a resistor 95 is connected also from base terminal 92 directly to ground.

An emitter terminal 96 of the transistor T6 is connected directly to ground, but the collector terminal 97 is connected through a load resistor 98 to a suitable source of negative voltage at a terminal 99.

The output of the transistor T6 is connected from the collector terminal 97, through a diode 100 and a resistor 101 to a base terminal 102 of a switching transistor T7. The base terminal 102 of the transistor T7 is connected also through a resistor 103 to a suitable source of positive voltage at the terminal 104.

To perform the conditioning function for the AND gate 23, FIG. 1, a lead 105, is connected through a resistor 106 and a diode 107 to a lead 27 and, from there, directly to the amplifier circuit 26. To control which of the leads 88 or 105 obtains the conditioning voltage necessary to permit the desired switching transistor 85 or 102 to operate, an appropriate signal is applied to the single terminal 108 through a resistor 109 to a base terminal 110 of a transistor T8. The base terminal 110 is connected also through a resistor 111 to a suitable source of positive voltage at a terminal 112, and a resistor 113 is connected also from the base terminal 110 to ground.

An emitter terminal 114 is connected directly to ground, but a collector terminal 115 is connected through a load resistor 116 to a suitable source of negative voltage at a terminal 117. The output from the amplifier circuit 26 is taken from the collector terminal 115 and is connected over both of the leads 31 and 27.

As described previously, the lead 27 connects the output of the amplifier circuit 26 to the lead 105, but now, the lead 31 also connects the output of the amplifier circuit 26 through a resistor 118 to a base terminal 119 of a transistor T9. The base terminal 119 is connected through a resistor 120 to a source of positive voltage at a terminal 120a, and an emitter terminal 121 is connected directly to ground.

A collector terminal 122 is connected through a load resistor 123 to a suitable source of negative voltage at a terminal 124, and the output of the inverter circuit 32 is taken from the collector terminal 122 for applying a conditioning signal to the lead 88.

In operation, assume that a zero voltage represents a "stop" signal, and a negative voltage signal represents a "run" signal. With a zero voltage applied to the input terminal 53, the base terminal 54 of the transistor T1 is at a positive potential due to the voltage divider network provided by the resistors 56 and 58 and the positive voltage at the terminal 57. Therefore, with the transistor T1 biased in the "off" condition, the collector terminal 60 is at a negative potential which is applied to the base terminal 64 to turn the transistor T2 in the "on" condition.

With the transistor T2 "on," the collector terminal 68 is at ground potential, and with this ground connection removing the negative potential which would be at the leads 15 and 16, the transistor T3 is biased "off" due to the positive voltage connected at the terminal 73. The transistor T3 being "off," means that the switching function which it would preform is now in an "open" switch condition, which connects the brake actuator coil 50 in series with a choke coil L1 and a source of electrical potential E connected at a terminal 130. The series circuit will be completed through a resistance 131, a connection 132 through the closed switching transistor T5, through a connection 133, and through the closed switching transistor T7 to ground.

With the brake actuator coil 50 energized, neither one of the pinch rollers coils 51 and 52 must be energized, and this condition is obtained through the lead 19, the lead 20 and the transistor T4. The zero potential applied at the input terminal 53 in order to energize the brake actuator coil 50 develops a ground potential at the lead 15, as described above.

A positive potential applied to the base terminal 75 of the transistor T4 results in the transistor T4 being biased in the "off" condition due to the positive voltage connected at the terminal 77, and therefore, the negative potential connected at the terminal 82 off-sets the positive voltage connected at the terminal 87, so that the transistor T5 is "on" (switch closed in a selected shorting condition). However, this condition of the transistor T5 will result only if the potential at the lead 88 permits it, and the same situation exists at the lead 105 concerning the transistor T7.

To see what condition exists at the leads 88 and 105, assume that a zero potential is applied at the terminal 108 to select the "forward" direction pinch roller actuating coil 51. As explained previously in connection with FIG. 1, a signal applied at the "forward" terminal 24 selects the pinch roller device 30 and excludes or prevents the selection of the "reverse" pinch roller device 37.

Therefore, with the connection 88 conditioned, the transistor T5 could be switched "off," removing the short circuit permitting the "forward" pinch roller actuator coil 51 to become energized from the energy stored in the choke coil L1. A zero signal had been applied at the input terminal 53 which results in transistor T1 being "off," transistor T2 being "on," and transistor T6 being "off" causing the negative voltage at the terminal 99 to off-set the "off" biasing voltage at the terminal 104. Therefore, the transistor T7 is "on" and in a conducting state, providing a short circuit for the "reverse" pinch roller actuator coil 52.

A "forward" representing signal at the terminal 108 of zero potential means that the transistor T8 is baised in the "off" condition and the lead 31 has a negative potential due to the negative voltage at the terminal 117, which means that the transistor T9 is "on." With the lead 33 at ground potential, the lead 88 has no potential to change the "off" state of the transistor T5.

To remove the brake and to operate the "reverse" pinch roller, a negative voltage is applied at the terminal 53, and a negative voltage is applied at the terminal 108. From the preceding description, it will be apparent that a negative voltage at the terminal 108 makes the lead 105 at ground and the lead 88 at a negative potential.

A negative potential at the terminal 53 overcomes the positive voltage at the terminal 57, and the transistor T1 becomes conducting, changing the voltage at the collector terminal 60 from negative to ground. This turns the transistor T2 "off" and the transistor T3 turns "on" shorting the brake actuator coil 50, and causing the brake to de-energize.

The negative potential developed at the lead 15 is applied over the lead 20 to turn transistor T4 "on" which connects the negative voltage at the terminal 82 off-setting the positive voltage at the terminal 87 which would, if permitted by the lead 88, turn the transistor T5 "off" removing the short circuit across the "forward" pinch roller actuator coil 51. To see if this condition obtains, the negative voltage applied at the terminal 108 results in the transistor T8 being "on," connecting lead 31 to ground and turning the transistor T9 "off." This applies the negative potential from the terminal 124 to the lead 33. Therefore, there is a negative potential at the lead 88 to off-set the positive voltage at the terminal 87, and the transistor T5 is turned "on," shorting the "forward" pinch roller actuator coil 51.

With the brake coil 50 de-energized and the "forward" pinch roller actuator coil 51 de-energized, attention is directed to the "reverse" pinch roller actuator coil 52. The negative potential at the lead 15 is connected over the leads 19 and 22 to off-set the positive voltage at the terminal 94 permitting the transistor T6 to turn "on" connecting the collector terminal 97 to ground removing the negative voltage at the terminal 99 from influencing the positive voltage at the terminal 104, and therefore, the transistor T7 turns "off," if permitted by the lead 115.

As described above, with a "reverse" indicating voltage applied to the terminal 108, the lead 105 is at ground, and therefore, there is no voltage to change the "off" state of the transistor T7. With the transistor T7 "off," the short circuit around the "reverse" pinch roller actuator coil 52 is connected in series with the "slave" choke L1 to share the electrical energy stored therein and become energized substantially instantly.

Referring now to FIG. 4 of the drawings, a modification of the circuit described above is illustrated for the purpose of providing a more rapid de-energization of the coil L1 (FIG. 3). For example, while coil L2 may be energized extremely fast upon the switch S being open, the de-energization of the coil L2 is slower upon the closing of the switch S because the voltage stored in the coil L2 develops a circulating current around through switch S and the resistor R2.

In accordance with the modification of FIG. 4, a transistor T10 is connected in series with a brake actuator coil 50' so that upon conduction of the transistor T10 the energy stored in coil L1' is transferred immediately to the coil 50'. The circuit is traced from terminal 130', transistor T10 to ground.

In order to accomplish the above, however, the parallel connection of the coil L1' through lead 140, through transistor T11 to ground, must be interrupted. This is accomplished by connecting a lead 141 from the collector terminal 142 of the transistor T10 through a lead 143 to point 144 so that the point 144 is clamped to ground when the transistor T10 becomes conductive. With the point 144 at ground, the transistor T11 becomes nonconductive, thus interrupting the path from lead 140 to ground.

Therefore, it may be seen that the circuit shown in FIG. 4 is extremely rapid in operation both in energizing coil 50′ and in de-energizing the coil 50′ because the actuation of the transistors T10 and T11 is extremely rapid.

If a pinch roller coil is desired to be included, it will be connected as illustrated by the coil 51′ connected by lead 145, through lead 140 to the coil L1′. Therefore, a suitable signal to control a transistor T12 will cause energization of the coil 51′, and a lead 146 through the lead 143 to the point 144 and render the transistor T11 nonconductive whenever the coil 51′ is energized.

Isolating diodes 147 and 148 are connected in the leads 141 and 146, respectively, to isolate the coil 50′ and the coil 51′.

Suitable signals to control the transistors T10 and T12 are supplied in a manner similar to that described in connection with FIG. 2.

In operation, assume that transistor T11 is conductive and the coil L1′ is energized through the path from terminal 130′ and the lead 140. In this condition of the circuit, transistors T10 and T12 will be nonconductive.

If it is desired now to energize the coil 51′ which is a pinch roller coil, transistor T12 is rendered conductive connecting lead 145 to ground and causing transistor T11 to become nonconductive. Thus, the electrical energy stored in the coil L1′ is immediately transferred and now available to energize the coil 51′. This causes an extremely rapid energization of the coil 51′.

Conversely, with the coil 51′ energized, assume that it is desired to de-energize the coil 51′. A suitable "stop" signal is applied to render the transistor T10 conductive and the transistor T12 nonconductive. The circuit including the coil 51′ will immediately be interrupted because the transistor T12 is nonconductive, and the transistor T11 is nonconductive also. With the transistor T10 conductive, the coil 50′ will be energized, thus transferring operation from the coil 51′ to the coil 50′ substantially instantly.

The following claims are intended to define the valid scope of this invention over the prior art and to cover all changes and modifications falling within the true spirit and valid scope of the invention.

What is claimed is:

1. In a tape handler apparatus adapted to start and stop tape motion at high speeds for transferring information-representing code between a transducer means and an elongated tape, the combination including:
   a brake actuating coil adapted to operate a brake device for reacting with the tape in bringing tape motion to a stop,
   a pinch roller actuating coil adapted to operate a pinch roller device to pinch the tape against a drive capstan for causing tape motion,
   an inductive energy storage device connected with the brake actuating coil,
   an electrical shorting circuit connected across the brake actuating coil including switch means,
   circuit means selectively operable to de-energize the pinch roller actuating coil, and
   means to connect a source of electrical voltage across the energy storage device in series with the circuit of the brake actuating coil and the shorting circuit, whereby the brake actuating coil becomes energized by sharing electrical energy from the energy storage device when the switch means is operated to remove the short circuit provided by the electrical shorting circuit.

2. In a tape handler apparatus as set forth in claim 1 wherein the energy storage device is in the form of a choke inductor coil.

3. In a tape handler apparatus as set forth in claim 1 wherein the circuit means to de-energize the pinch roller actuating coil includes series connection means with the energy storage device.

4. In a tape handler apparatus as set forth in claim 1 wherein the switching means included in the electrical shorting circuit is in the form of a transistor.

5. In a tape handler apparatus as set forth in claim 2 wherein the choke inductor coil, the brake actuating coil and the pinch roller actuating coil are all connected electrically in series.

6. In a tape handler apparatus as set forth in claim 5 wherein the switch means included in the electrical shorting circuit is in the form of a transistor, and the circuit means to de-energize the pinch roller actuating coil includes an electrical shorting circuit similar to the first-mentioned electrical shorting circuit.

7. In a tape handler apparatus as set forth in claim 3 including inverter circuit means connected with the pinch roller actuating coil so that the brake actuating coil and the pinch roller actuating coil will not be energized by the same signal.

8. In a tape handler apparatus as set forth in claim 1 including a second pinch roller actuating coil adapted to operate a second pinch roller device for causing tape motion in a direction opposite the motion developed by the first-mentioned pinch roller actuating coil, and circuit means including an electrical shorting circuit to de-energize the second pinch roller actuating coil in response to a predetermined signal.

9. In a tape handler apparatus adapted to start and stop tape motion at high speeds for transferring information-representing code between a transducer means and an elongated tape, the combination including:
   a brake actuating coil adapted to operate a brake device for reacting with the tape in bringing tape motion to a stop,
   a first pinch roller actuating coil adapted to operate a first pinch roller device to pinch the tape against a drive capstan for causing tape motion in a forward direction,
   a second pinch roller actuating coil adapted to operate a second pinch roller device to pinch the tape against a second drive capstan for causing tape motion in a reverse direction,
   a choke inductor coil adapted to store electrical energy when a source of electrical potential is connected therewith,
   circuit means connecting the choke inductor coil in series with the first and second pinch roller actuating coils and the brake actuating coil,
   a first switching transistor connected in circuit shorting relationship across the brake actuating coil,
   second and third switching transistors connected, respectively, in circuit shorting relationship across the first and second pinch roller actuating coils, and
   input circuit means to connect actuating signals selectively between the first, second and third switching transistors,
   whereby a short circuit across one if the actuating coils is removed and the selected coil becomes energized by sharing the electrical energy stored in the choke inductor coil.

10. In a tape handler apparatus adapted to start and stop tape motion at high speeds for transferring information-representing code between a transducer means and an elongated tape, the combination including:
   a brake actuating coil adapted to operate a brake device for reacting with the tape in bringing tape motion to a stop,
   a pinch roller actuating coil adapted to operate a pinch roller device to pinch the tape against a drive capstan for causing tape motion,
   an inductive energy storage device connected with the brake actuating coil,
   an electrical shorting circuit connected across the brake actuating coil including first switch means,
   circuit means selectively operable to de-energize the pinch roller actuating coil, second switch means in series with the pinch roller actuating coil and connected to be opened when the circuit means to de-energize the pinch roller actuating coil is actuated, and means to connect a source of electrical voltage across the energy storage device in series with the circuit of the brake actuating coil and the electrical shorting circuit, whereby the brake actuating coil becomes energized by sharing electrical energy from the energy storage device when the switch means is operated to remove the short circuit provided by the electrical shorting circuit.

11. In a tape handler apparatus as set forth in claim 10 wherein the first and second switch means are in the form of transistors.

12. In a tape handler apparatus as set forth in claim 10 including isolating diodes connected intermediate the brake actuating coil and the pinch roller actuating coil so that the operation of these two circuits is controlled separately.

13. In a tape handler apparatus adapted to start and stop tape motion at high speeds for transferring information representing code between a transducer means and an elongated tape, the combination including:

a brake actuating coil adapted to operate a brake device for reacting with the tape in bringing tape motion to a stop, an electric shorting circuit connected across the brake actuating coil including switch means selectively operable to remove the short circuit provided by the electric shorting circuit, an inductive energy storage device connected in series with the circuit of said brake actuating coil and said electric shorting circuit, and means to connect a source of electric voltage across the series circuit of said energy storage device and the circuit of said brake actuating coil and said electrical shorting circuit, whereby the brake actuating coil becomes energized by sharing electrical energy from the energy storage device when said switch means is operated to remove the short circuit provided by the electrical shorting circuit.

14. In a tape handler apparatus adapted to start and stop tape motion at high speeds for transferring information representing code between a transducer means and an elongated tape, the combination including:

a brake actuating coil adapted to operate a brake device for reacting with the tape in bringing tape motion to a stop, a first switch means connected in series with said brake actuating coil selectively operable to open the circuit to said brake actuating coil, an electrical shorting circuit connected across the series circuit of said brake actuating coil and said first switch means, said electrical shorting circuit including second switch means selectively operable to remove the short circuit provided by the electrical shorting circuit, an inductive energy storage device connected in series with the circuit of said brake actuating coil and said first and second switch means, and means to connect a source of electrical voltage across the series circuit of said energy storage device and the circuit of the brake actuating coil and said first and second switch means, whereby the brake actuating coil becomes energized by sharing electrical energy from the energy storage device when said first switch means is operated to close the circuit to said brake actuating coil and said second switch means is operated to remove the short circuit provided by said electrical shorting circuit and said brake actuating coil becomes de-energized when said first switch means is operated to close the circuit to said brake actuating coil and said second switch means is operated to replace the short circuit provided by said electrical shorting circuit.

References Cited by the Examiner

UNITED STATES PATENTS

| | | | |
|---|---|---|---|
| 2,877,012 | 3/59 | Angel et al. | |
| 3,014,159 | 12/61 | Frank | 317—148.5 X |
| 3,032,690 | 5/62 | Elliot | 317—148.5 X |
| 3,036,229 | 5/62 | Kemp et al. | 317—137 X |
| 3,064,165 | 11/62 | Kennedy | 317—148.5 |
| 3,097,777 | 7/63 | Floyd | 226—39 |
| 3,100,591 | 8/63 | Trimble | 226—39 |
| 3,124,724 | 3/64 | Mihalek | 317—148.5 |
| 3,140,428 | 7/64 | Shepard | 317—148.5 |
| 3,154,727 | 10/64 | Hulls | 317—148.5 X |

M. HENSON WOOD, JR., *Primary Examiner.*

ANDRES H. NIELSEN, ROBERT B. REEVES,
*Examiners.*